C. KRÄMER.
DEVICE FOR TIGHTENING OF CABLES.
APPLICATION FILED APR. 16, 1908.
916,721.
Patented Mar. 30, 1909.
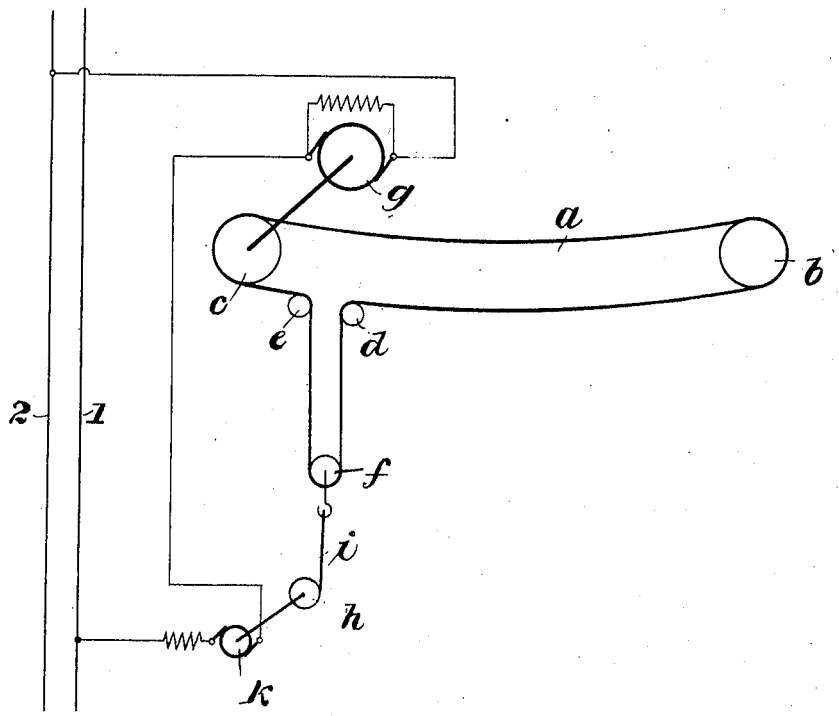

UNITED STATES PATENT OFFICE.

CHRISTIAN KRÄMER, OF FRANKFORT-ON-THE-MAIN, GERMANY, ASSIGNOR TO THE FIRM OF FELTEN & GUILLEAUME-LAHMEYERWERKE AKTIEN-GESELLSCHAFT, OF FRANKFORT-ON-THE-MAIN, GERMANY.

DEVICE FOR TIGHTENING OF CABLES.

No. 916,721.     Specification of Letters Patent.    Patented March 30, 1909.

Application filed April 16, 1908. Serial No. 427,509.

*To all whom it may concern:*

Be it known that I, CHRISTIAN KRÄMER, a subject of the German Emperor, and a resident of Frankfort-on-the-Main, Germany, have invented certain new and useful Improvements in or Relating to Devices for Tightening of Cables, of which the following is a specification.

The present invention relates to the transportation of loads between points, the distance between which is variable, by means of cables.

An example of the use of such apparatus is found in the transportation of coal or other articles between ships or between a ship and the shore, the transportation being effected by means of a vehicle and cables which at one end are secured to the ship and at the other end are secured to another ship or the shore as the case may be. It will be apparent that under the circumstances just referred to, the rolling of the ship or ships will vary the distance between them and, in case provision to avoid it were not made, the tension of the cables would be alternately slackened and tightened as the points came closer together or were moved farther from each other. It is generally necessary, in apparatus of the character described, that the transportation cables should have practically a constant tension.

One object of the present invention is to regulate the tension by means of an automatically operating motor which may be designated as a "stretching" motor.

Another object of the invention is to so connect the stretching motor that it will have a regulating action upon the circuit of the driving motor.

Another object of the invention is to provide a stretching motor of such type that the energy losses therein will be a minimum.

Another object of the invention is to provide a driving motor which will maintain practically constant speed of the cable even though the voltage impressed upon the driving motor may be varied.

The invention is illustrated in the accompanying drawing which is a diagram showing the electrical connections and the relations of the mechanical parts.

Referring to the drawing, the endless conveyer cable $a$ passes over the two rollers or drums $b$ and $c$, one of these rollers being mounted at one of the points between which transportation is to be effected, as a ship, while the other is located at the other of those points which may be another ship or the shore. The endless cable $a$ is also caused to form a loop by passing over the pulleys $d$, $e$ and $f$. The pulley $f$ is free to move under the influence of a cable $i$ adapted to be wound upon or unwound from a drum $h$, it being obvious that as the cable $i$ is unwound the tension upon the driving cable $a$ will be relieved while when the cable $i$ is wound up any slack in the cable $a$ will be taken up.

One of the drums $b$ or $c$, in this case $c$, is driven by a motor $g$. This motor is of the shunt type and is self excited, its field being connected across the terminals of the armature as shown. It will be apparent that any change of voltage across the armature will also affect the field with the result that a practically uniform speed will be maintained even though the voltage applied to the terminals of the motor may vary. The desirable end of maintaining the speed of the conveying cable practically constant is therefore attained. Mechanically connected with the drum $h$ is a series motor $k$ which is connected in series with the driving motor $g$ between the mains 1 and 2. The term series motor is used with the meaning well understood in the art, namely, that the field is connected in series with the armature, as shown. It will be apparent that the current supplied by the mains 1 and 2 to the driving motor $g$ will pass through the motor $k$ and thereby a torque will be developed in the motor $k$. The parts of this motor are so arranged and connected that this torque tends to wind up the cable $i$ upon the drum $h$ so as to hold the conveying cable $a$ in tension. During normal operation of the apparatus the motor $k$ will be at rest, although exerting a tension upon the cable $a$, so that the only energy consumed therein is limited to the loss due to the ohmic resistance of its winding, which, as it is well-known, is small in a series motor. If now the drums $b$ and $c$ move closer together, and slack thereby caused in the cable $a$, the torque in the "stretching" motor $k$ will cause it to rotate as a motor to take up the slack, this action taking place automatically. The operation of the motor $k$ however, as described, causes a counter electro-motive force to be developed which opposes the electro-motive force of the mains 1 and 2 with the result that the momentary tendency of the driving motor to speed up upon the throwing off of the load is counter acted. The operation of the "stretching" motor continues as just described until the tension of the cable has been increased to such an extent as to counterbalance the torque of the "stretching" motor. On the other hand if the drums $b$ and $c$ are more widely separated the torque of the motor $k$ will be overcome and it will be driven as a dynamo, its electromotive force being added to that of the mains 1 and 2, the sum of these electromotive forces being impressed upon the driving motor $g$. This operates to counter-act the momentary tendency of the driving motor to slow down upon the sudden throwing on of the load. The motor $k$ continues to be driven as a dynamo until its torque becomes counter-balanced by the tension of the cable when it comes to rest. It will now be apparent that the motor $k$ operates to automatically regulate the circuit of the driven motor and this without the interposition of resistance or other devices which are wasteful of energy.

It is further to be noted in connection with the present invention that no special form of motor is necessary but that the usual commercial motors may be employed.

What I claim is:—

1. In a device of the character described, the combination with a cable of an electric motor for driving the same and an electric motor for automatically maintaining the tension of said cable, said motors being connected in series.

2. In a device of the character described, the combination with a cable of an electric motor for driving the same and an electric motor for automatically maintaining the tension of said cable, said motors being connected in series, said driving motor having its field connected across the terminals of its armature.

3. In a device of the character described, the combination with a cable, of an electric motor for driving the same and a series motor for automatically maintaining the tension of said cable, said motors being connected in series.

4. In a device of the character described, the combination of a cable, a driving motor therefor having its field connected across the terminals of its armature, and a series motor for automatically maintaining the tension of said cable, said motors being connected in series between the supply mains.

In testimony whereof I have signed my name to this specification in the presence of two subscribing witnesses.

CHRISTIAN KRÄMER.

Witnesses:
ERWIN DIPPEL,
MICHAEL VOLK.